L. C. TRENT.
METHOD OF TREATING METAL BEARING SOLUTIONS.
APPLICATION FILED AUG. 24, 1914.
1,283,364.
Patented Oct. 29, 1918.
2 SHEETS—SHEET 1.
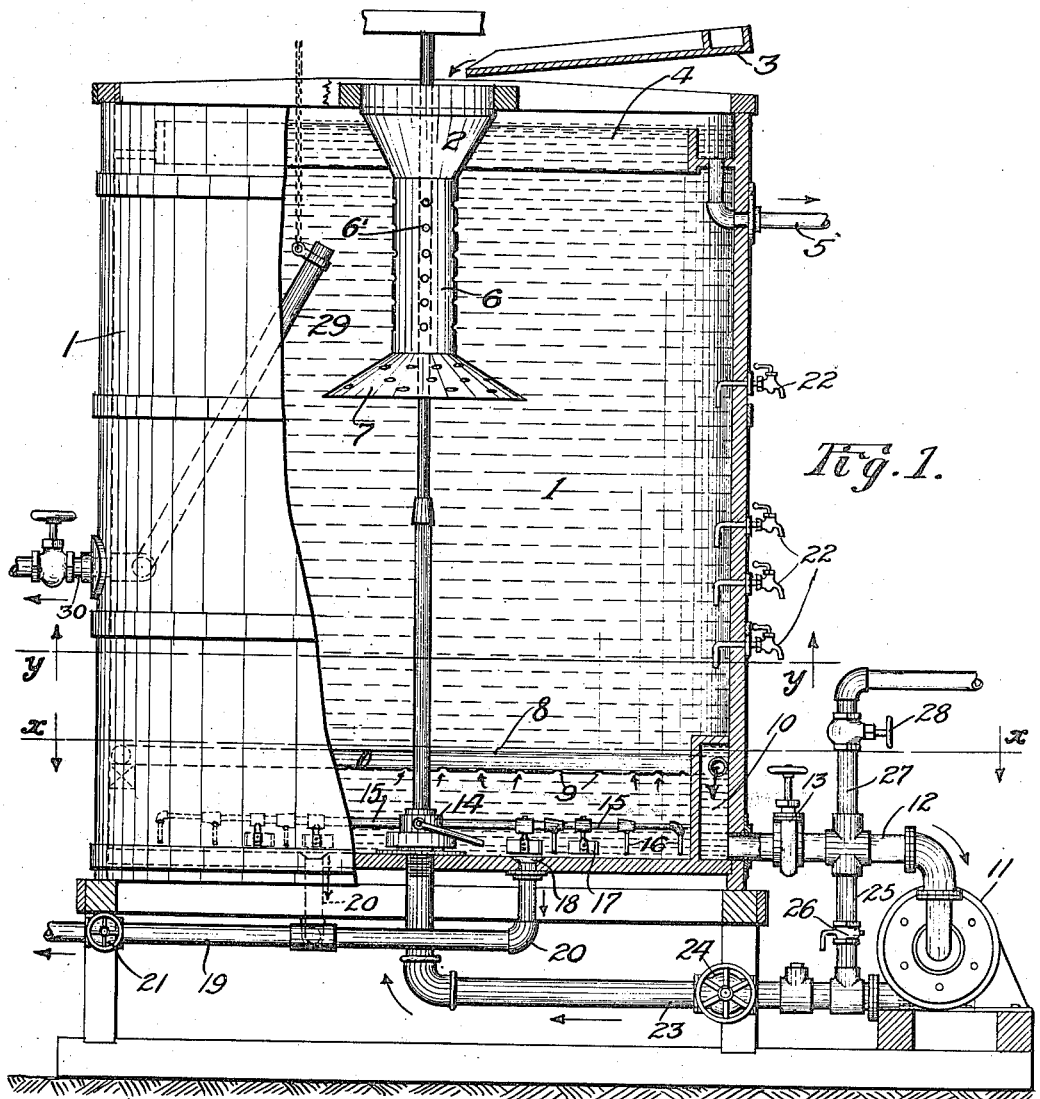
Fig. 1.
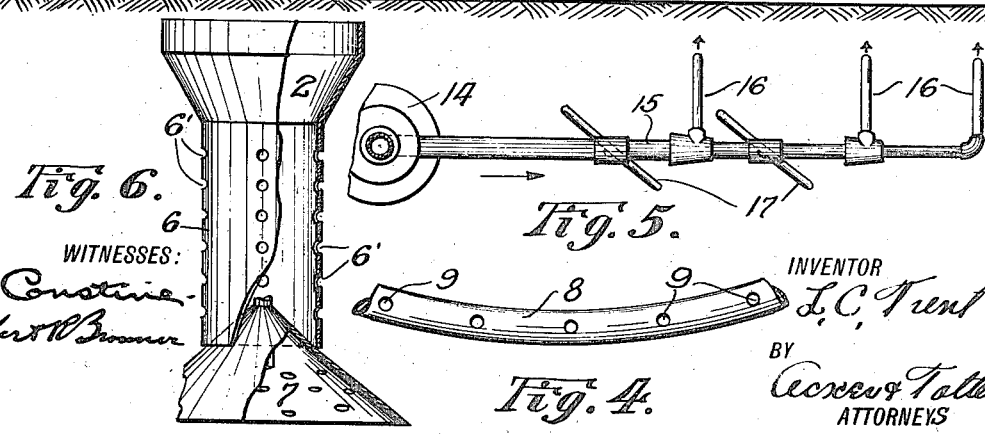
Fig. 6.    Fig. 5.
WITNESSES:
S. Constine
Elbert W. Bremer
Fig. 4.
INVENTOR
L. C. Trent
BY
Cooper & Totten
ATTORNEYS L. C. TRENT.
METHOD OF TREATING METAL BEARING SOLUTIONS.
APPLICATION FILED AUG. 24, 1914.

1,283,364. Patented Oct. 29, 1918.
2 SHEETS—SHEET 2.

WITNESSES:

INVENTOR

BY

ATTORNEYS

UNITED STATES PATENT OFFICE.

LAMARTINE C. TRENT, OF LOS ANGELES, CALIFORNIA.

METHOD OF TREATING METAL-BEARING SOLUTIONS.

1,283,364.   Specification of Letters Patent.   Patented Oct. 29, 1918.

Application filed August 24, 1914. Serial No. 858,410.

*To all whom it may concern:*

Be it known that I, LAMARTINE C. TRENT, a citizen of the United States, residing at Los Angeles, in the county of Los Angeles and State of California, have invented certain new and useful Improvements in Methods of Treating Metal-Bearing Solutions, of which the following is a specification.

The present invention relates to a new method for the treatment of mixtures of solids and liquids for the recovery of values therefrom and for the separation of the solids and liquids thereof, the same being mainly designed for the treatment of cyanid slimes and other valuable pulps.

The method involved in carrying out the invention is based on the principle that under proper conditions the solids of the material to be treated will settle through a zone of pulp maintained within a receiving vessel (in which zone the solids are falling while the liquid of such zone is either rising or has little or no tendency to rise or fall), while the liquid of the material to be treated mixes to a limited degree only with the liquid of said zone or with the replacing liquid which is introduced near the bottom of the receiving vessel. The pulp near the bottom of the receiving vessel is maintained during the operation in a condition of agitation, this agitation tending to prevent the replacing liquid from forming channels in the pulp and to promote a uniform distribution of the replacing liquid throughout the pulp near the bottom of the vessel and to maintain the proper consistency and movement in the zone of pulp above the zone of agitation, and thereby to minimize the mixing of the liquid of the pulp to be treated with the replacing liquid.

The method is applicable to the treatment of slimes and pulps generally, among which may be mentioned ore pulps which contain values in solution, such as are obtained in the cyanidation of gold and silver ores or in treatment of mineral products with acid or other solvents, and in the lixiviation of crude niter and other natural salts, and for the replacement of water from pulps with valuable solutions and solvents preparatory to further treatment, and in general the method may be said to relate to the treatment of finely crushed solids in admixture with solutions, solvents or other liquids, its object being to provide for separating the solid and liquid constituents of the pulp or slime to be treated, through settling and through the complete or partial replacement of the liquid of the material to be treated with another liquid or solution or with depleted solvent or water; to discharge or permit of the withdrawal of the liquid which has been displaced, with or without admixture of replacing liquid; and to discharge the solids in a thick pulp which is partially or entirely freed from the liquid or solution which was a part of the material to be treated. A further object is to dissolve values from the solids, as when active solutions are used to replace pregnant solutions or water, it being practical to later recover the replacing solution from the pulp by a similar treatment with another replacing liquid.

The improved method resides essentially in receiving the material to be treated within a receiving vessel, and imparting agitation to assist in settling and to create a circulation within the thickened material under treatment, adding thereto a supply of different liquid for replacing liquid of the pulp received for treatment or for both the purpose of replacement and for dissolving values, and overflowing or permitting of the withdrawal of the replaced or excess liquids near the top of the vessel and discharging the solids with replacing liquid from at or near the bottom of the vessel, continuously or intermittently. In carrying out the method, the replacing liquid may or may not be introduced in sufficient quantity to cause a rising current of the same throughout the thickened mass within the vessel.

The steps of the method are, the reception of the slimes or pulp within a vessel, the settling and thickening of the same with separation of excess liquid, the introduction of a replacing liquid, agitation and circulation within the thickened pulp, the formation and maintenance of a zone of pulp above the zone of agitation of a suitable height and in proper condition, by means of the regulated agitation, and the removal of the excess and replaced liquids and the removal of the solids mixed with replacing liquid.

Any suitably constructed apparatus may be employed for carrying out the present method, but preference is given to the one herein illustrated due to the fact that its operativeness has been practically demonstrated for the workings of the method, wherein—

Figure 1 is a vertical sectional view of the improved apparatus for the treatment of liquid generally from which solids are to be separated, the lowered position of the decanting tube being illustrated in dotted lines.

Fig. 4 is a broken detail view of a portion of the suction pipe of the receiver.

Fig. 5 is a similar view of the centrifugal agitator.

Fig. 6 is a detail view of the diffuser through which the cyanid slimes are fed into the receiving vessel.

Figure 2:
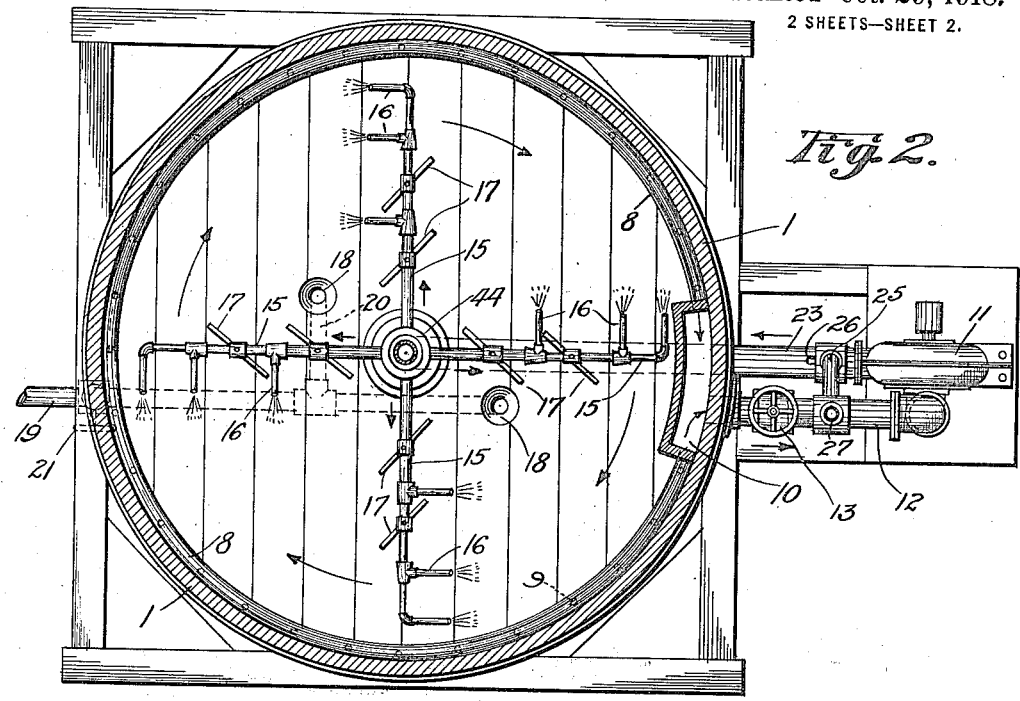
Fig. 2 is a sectional view taken on line x—x Fig. 1 of the drawings, disclosing the general arrangement of the agitating means.
Figure 3:
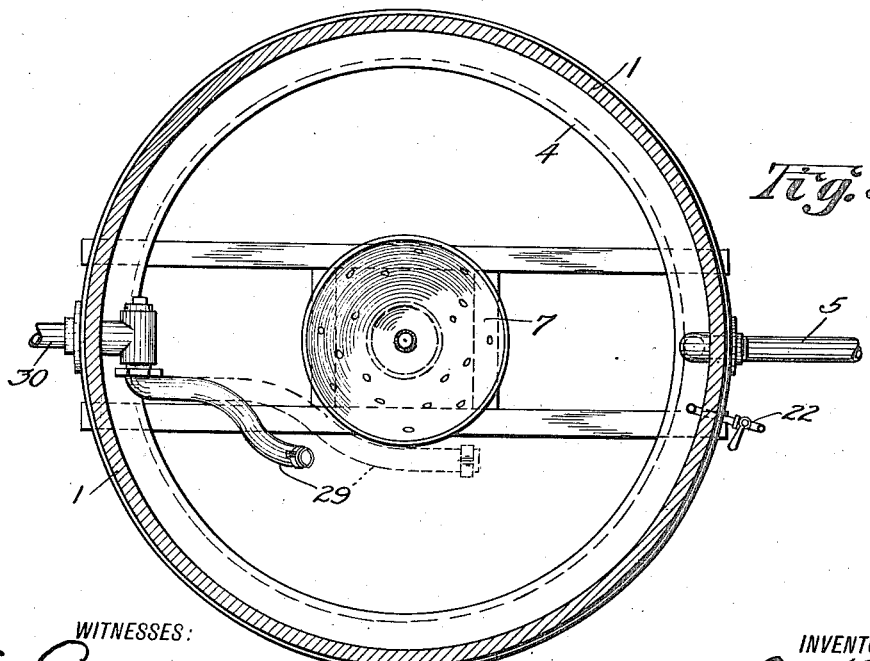
Fig. 3 is a sectional view taken on the line Y—Y of Fig. 1 of the drawings looking in the direction of the arrow.

In the drawings, the numeral 1 is used to designate any suitable form of a receiving vessel or tank for the reception of the material to be treated, the dimension of which depends on the desired tonnage capacity for the apparatus; 2 a diffuser situated within the said vessel adjacent the top thereof, and into which the mixed slimes and liquid to be treated are fed by a supply launder 3. Surrounding the upper portion of the diffuser 2 and within the vessel 1 is arranged a launder 4 for receiving the overflowing clear solution, which is discharged through the outlet pipe 5. The diffuser is provided with a depending perforated cylindrical body 6, which is closed at its lower end by means of the cone-shaped deflector 7 for gently spreading the material escaping from the diffuser into the body of liquid within the receiver.

A given distance from the bottom of the receiving tank is located a suction pipe 8, and, in order that the solution may be withdrawn from more than one point and from the entire circumference of the vessel 1, the suction pipe 8 is circular and provided with a series of inlet perforations 9. These perforations are for distributing the inlet around the circumference of the vessel 1 and are placed in the bottom or under-face of the suction pipe 8 in order that the inflow of the circulating liquid will prevent the slimes from settling in the said pipe and blocking the flow therethrough, and the said suction pipe discharges into a closed suction chamber or reservoir 10, which communicates with an exteriorly disposed suction pump 11 by means of a suction pipe 12, the flow of solution therethrough into the suction pump 11 being regulated by the controlling valve 13.

Adjacent the bottom of the receiving vessel 1 is mounted for rotation an agitator 14, the hollow arms 15 projecting therefrom being each provided with a series of discharge nozzles 16, and by said agitator a series of adjustable scrapers 17 are carried, which serve to force the thickened slimes or mud toward the outlet openings 18 in the bottom of the receiver, through which the same escape into the delivery pipe 19 by means of the connections 20 therewith, the said delivery pipe conducting the thickened slimes to a suitable place of deposit. By means of the hand controlled valve 21 within the delivery pipe 19, the flow of material through the said pipe may be readily regulated or controlled.

The receiving vessel 1 is provided with a series of vertically disposed small try-cocks 22, the purpose of which is to permit of the solution within the upper portion of the tank or vessel 1 to be occasionally tested to ascertain whether or not it is barren or impregnated with metals or chemicals, inasmuch as the apparatus is not intended solely for the purpose of thickening solutions and separating precious metals from liquids, but equally so for the recovery of cyanid and other chemicals to be utilized for later use.

The thickened liquid material drawn into the suction pump 11 from the receiver 1 is delivered therefrom under pressure into the agitator 14 from the bottom thereof through the connecting delivery pipe 23, and entering the agitator under pressure imparts rotation thereto as the material is discharged from the outlet nozzles or perforations 16 of the tubular arms 15, the jet streams thus discharging into the body of material within the bottom portion of the vessel 1 imparting gentle agitation thereto. By means of the hand controlled valve 24 in the delivery pipe 23, the flow of material from the pump 11 therethrough into the agitator 14 may be regulated as desired, and by means of the valve controlled by-pass connection 25 between the suction pipe 12 and the delivery pipe 23, a portion of the material flowing from the pump 11 may be by-passed from the delivery pipe 23 to the suction pipe 12, on the valve 26 of the connection 25 being opened, thus temporarily reducing the quantity flow into the suction pump and the discharge thereof to the agitator and by so doing decreasing the speed of the agitator within the receiving vessel.

In case it is desired to add fresh solution in the receiver 1 for replacement of the liquid overflowing therefrom or to supply thereto fresh water for wash purposes, the same is admitted into the suction pipe 12, on the valve 13 being closed, by means of the supply pipe 27 connected thereto, the flow of liquid therethrough being controlled by the valve 28. This by-passing of the liquid is intended for the purpose of regulating and adjusting the speed of the agitator.

A decanting pipe 29 hinged to an outlet pipe 30 is provided within the receiving vessel for drawing off the clear liquid as the solids are settled within the bottom of the receiving vessel, the said decanting tube being swung up and down in any suitable manner. By the employment of the decanting pipe or tube 29, the agitator may be stopped at any time after treatment of the solution by cutting off the flow thereto through the delivery pipe and the charge within the receiving vessel permitted to settle and the clear solution decanted therefrom to the proper point, leaving the slimes thickened to a proper consistency for delivery to filters or filter presses. The agitator may be kept in operation in such a manner as to assist in settling the slimes, the clear solution decanted during such operation, and the foul or saturated solutions may be entirely removed and replaced with fresh solution or with wash water and delivered from the overflow launder to other apparatus or receptacles.

The pump, agitator and circular suction pipe form an agitating zone at or adjacent the bottom of the receiving vessel or tank 1 to which the agitation is confined as near as possible, and this is accomplished by proper adjustment of the speed of the agitator. Where the apparatus is utilized as a thickener for slimes, the overflow launder 4 carries off the clear solution from the top after the slimes have been settled and the clear liquid is delivered through the outlet 5 to any suitable place of deposit.

In the operation of the apparatus for carrying out the invention, the receiver being constantly full, the pulp or slimes for treatment are fed from the launder 3 to the diffuser 2 above the receiver 1. The diffuser causes the pulp thus fed to flow into the receiver gently with as little agitation and disturbance as possible through the perforations 6¹. During this flow into the receiver 1, the solids are gradually settled to the bottom thereof as a thickened pulp, the agitation which is imparted to the material within the zone of agitation assisting the thickening and the separation of liquid which rises in the receiving vessel and overflows as a clear liquid into the launder 4. In order to effect the principal purpose of the method, to more fully separate the remaining liquid from the pulp under treatment, a certain proportion of replacing liquid is admitted into the circulating pulp, passing into the pump 11, which replacing liquid displaces liquid from the material under treatment, the lower portion of the receiver thus being converted into a zone in which the replacing liquid has replaced the liquid of the pulp under treatment, with some incidental diffusion or mixing of the liquids, and the process is one of replacement.

By the employment of the decanting pipe or tube 29, the agitator may be stopped at any time after treatment of the pulp by cutting off the flow thereto through the delivery pipe and the charge within the receiving vessel permitted to settle and the clear solution decanted therefrom, leaving the slimes thickened to a proper consistency for delivery to filters or filter presses or for other purposes. The agitator may be kept in operation in such a manner as to only assist in settling the slimes, the clear solution being decanted during such operation, and the liquid remaining with the pulp may then be replaced with fresh solution or with wash water and delivered from the overflow or the decanting tube to other apparatus or receptacles.

The apparatus may be utilized for replacing the wash water or solution contained in filtered tailings for the recovery of any remaining values, alkali or chemical for re-use and for the recovery of water from mill tailings. The various uses to which the invention may be applied will appeal readily to those conversant with the art, inasmuch as it may be applied for the treatment of all classes of mixtures of solids and liquids.

The pump, agitator and circular suction pipe create an agitating zone at or adjacent the bottom of the receiving vessel 1 to which zone the agitation is confined as nearly as possible, and this is accomplished by proper adjustment of the speed of rotation of the agitator and the circulation maintained.

By treating the slimes or pulps under the present method. a clear, or nearly clear liquid is produced in the upper portion of the receiving vessel, through which the solids settle comparatively rapidly, and below which there is formed a zone of dense pulp of variable height, containing from twenty-five to sixty per cent. of solids by weight. Intermediate between the clear liquid above and the denser zone below there is a zone containing a smaller percentage of solids. These zones being maintained under the conditions described in the foregoing specifications, cause the pulp itself to form a barrier for the prevention of diffusion of the liquid of the material to be treated with that of the heavy pulp below or with the replacing liquid.

Through the zones of pulp there may or may not be an ascending body of the replacing liquid to serve for wash purposes and for replacement purposes, and when consisting of active solvents or chemical solutions to dissolve values from the solids or to cause other chemical changes which it may be desired to produce therein.

Having thus described the invention what is claimed as new and desired to protect by Letters Patent is:—

1. The method of separating values from solid bearing solutions, which consists in delivering the material for treatment into a receiving vessel, subjecting the same therein to gentle agitation for gradually thickening and settling the solids contained therein to form zones of separation, and during such agitation forcing into the material through the thickened zone thereof a barren liquid for dissolving the values carried thereby and replacing the clear pregnant liquid overflowing from the vessel.

2. The continuous method of treating solid bearing solutions for the recovery of values therefrom, which consists in delivering the material to be treated into a receiving vessel, causing a gradual thickening of the said material for dividing the same into zones of separation, maintaining the thickened material near the bottom of the vessel in a condition of agitation and forcing into the thickened material a barren liquid for dissolving the values carried thereby and replacing the clear pregnant liquid overflowing from the vessel.

3. The method of separating values from solid bearing liquids, which consists in delivering the material for treatment into a receiving vessel, subjecting the same therein to gentle agitation and settling the solids contained therein to form zones of separation and during such agitation forcing into the receiving vessel near the bottom thereof a liquid to replace the liquid in the pulp under treatment, which replaced liquid is withdrawn from near the top of the receiving vessel.

4. The method of separating values from solid bearing solutions which consists in delivering material for treatment into a receiving vessel, subjecting the material to circulation by withdrawing material from the vessel and returning the same thereto below an upper part of the body of liquid for gradually thickening and settling the solids contained therein to form zones of separation, introducing another liquid into the vessel for replacement purposes, and discharging the replaced liquid from the vessel.

5. The method of separating values from solid bearing solutions which consists in delivering material for treatment into a receiving vessel, subjecting the same therein to gentle agitation, subjecting the material to circulation by withdrawing material from the vessel and returning the same thereto below an upper part of the body of liquid for gradually thickening and settling the solids contained therein to form zones of separation, introducing another liquid into the vessel for replacement purposes, and discharging the replaced liquid from the vessel.

6. The method of separating values from solid bearing solutions, which consists in delivering the material for treatment into a receiving vessel, subjecting the material while in the receiving vessel to gentle stirring action applied near the bottom of the body of material for gradually thickening and settling the solids contained therein to form zones of separation and during such stirring forcing into the material near the bottom of the body of material a barren liquid for dissolving the values carried thereby and replacing the clear pregnant liquid overflowing from the vessel.

7. The method of separating values from solid bearing solutions which consists in delivering the material for treatment into a receiving vessel, subjecting the same in the vessel to circulation at a lower part of the body of material for gradually thickening and settling the solids contained therein to form zones of separation, an upper zone of nearly clear liquid; an intermediate zone of relatively denser pulp and a lower zone of denser pulp and during such circulation forcing into the material through the lower denser thickened zone thereof a liquid for dissolving the values and for replacing the clear pregnant liquid overflowing from the vessel.

8. The method of separating values from solid bearing solutions which consist in delivering the material for treatment into a receiving vessel, maintaining the pulp near the bottom of the vessel in a condition of agitation and circulation and during such agitation forcing into the material through the thickened zone a liquid for dissolving the values and for replacing the clear pregnant liquid overflowing from the vessel.

9. The method of separating values from solid bearing solutions which consists in delivering the material for treatment into a receiving vessel subjecting the same therein to circulation by withdrawing material from the vessel near the bottom thereof and returning the same to the vessel near the bottom thereof for gradually thickening and settling the solids contained in the material to form zones of separation including a lower thickened zone of pulp, and during such circulation forcing into the material through the thickened zone of pulp a liquid for dissolving the values and for replacing the clear pregnant liquid overflowing from the vessel.

10. The method of separating values from solid bearing solution which consists in delivering the material for treatment into a receiving vessel subjecting the same in the vessel to circulation by withdrawing material from the vessel from the body of material at a lower thickened zone thereof and returning the same back to the vessel at said lower thickened zone and during such circulation forcing into the material through said lower thickened zone thereof a liquid for dissolving the values for replacing the clear pregnant liquid overflowing from the vessel.

11. The method of separating values from solid bearing solutions which consists in delivering the material for treatment into a receiving vessel, subjecting the same therein to gentle agitation, subjecting the material to circulation by withdrawing material from the vessel at a lower thickened zone of the body of material and returning the same to the vessel at said lower thickened zone of the material, and during such agitation and circulation forcing into the material through the said lower thickened zone thereof a liquid for dissolving the values carried thereby and for replacing the clear pregnant liquid overflowing from the vessel.

In testimony whereof I have signed my name to this specification in the presence of two subscribing witnesses.

LAMARTINE C. TRENT.

Witnesses:
HARRY A. TOTTEN,
D. B. RICHARDS.